US012587360B1

(12) United States Patent
Vrubel et al.

(10) Patent No.: US 12,587,360 B1
(45) Date of Patent: Mar. 24, 2026

(54) MULTI-CHIP ACCELERATOR ARCHITECTURE FOR FULLY HOMOMORPHIC ENCRYPTION INFERENCE

(71) Applicant: Chain Reaction, Ltd., Tel Aviv (IL)

(72) Inventors: Oren Vrubel, Tel Aviv (IL); Nimrod Borer, Atlit (IL); Ilan Rosenfeld, Petah Tikva (IL)

(73) Assignee: Chain Reaction, Ltd., Tel Aviv (IL)

( * ) Notice: Subject to any disclaimer, the term of this patent is extended or adjusted under 35 U.S.C. 154(b) by 0 days.

(21) Appl. No.: 19/294,986

(22) Filed: Aug. 8, 2025

(51) Int. Cl.
*H04L 9/00* (2022.01)
*G06F 9/4401* (2018.01)
*H04L 9/06* (2006.01)

(52) U.S. Cl.
CPC ............ *H04L 9/008* (2013.01); *G06F 9/4401* (2013.01); *H04L 9/0618* (2013.01)

(58) Field of Classification Search
CPC ...... H04L 9/008; H04L 9/0618; G06F 9/4401
See application file for complete search history.

(56) References Cited

U.S. PATENT DOCUMENTS

| | | | |
|---|---|---|---|
| 8,515,058 B1 | 8/2013 | Gentry | |
| 10,075,288 B1 | 9/2018 | Khedr et al. | |
| 10,541,805 B2 | 1/2020 | Laine et al. | |
| 12,200,101 B2 | 1/2025 | Agrawal et al. | |
| 12,368,571 B1 | 7/2025 | Agrawal et al. | |

| | | | |
|---|---|---|---|
| 2021/0160225 A1 | 5/2021 | Liu et al. | |
| 2024/0022393 A1 | 1/2024 | Park | |
| 2024/0340158 A1 | 10/2024 | Choi et al. | |
| 2024/0394067 A1 | 11/2024 | Dimou et al. | |

(Continued)

FOREIGN PATENT DOCUMENTS

| | | |
|---|---|---|
| CN | 114201746 A | 3/2022 |
| CN | 115776367 A | 3/2023 |

(Continued)

OTHER PUBLICATIONS

De Castro, Leo, et al. "EncryptedLLM: Privacy-Preserving Large Language Model Inference via GPU-Accelerated Fully Homomorphic Encryption." Forty-second International Conference on Machine Learning. (Year: 2025).*

(Continued)

*Primary Examiner* — Sangseok Park
(74) *Attorney, Agent, or Firm* — M&B IP Analysts, LLC

(57) ABSTRACT

A system for fully homomorphic encryption (FHE) inference includes: a plurality of server modules; an interconnect operatively coupled to the modules and configured to distribute session-initialization data for a large-language-model session; a first plurality of application-specific integrated circuits (ASICs) on one or more of the modules, each configured to perform bootstrapping on ciphertexts during an initiation phase; and a second plurality of ASICs on the modules comprising: bootstrapping circuitry configured to store auxiliary data used for bootstrapping and to perform the bootstrapping operations on the ciphertexts; processing circuitry configured to perform homomorphic arithmetic operations other than bootstrapping; and support circuitry configured to perform functions that support the bootstrapping and processing circuitry.

18 Claims, 7 Drawing Sheets

(56)  References Cited

U.S. PATENT DOCUMENTS

| | | |
|---|---|---|
| 2024/0421971 A1 | 12/2024 | Agrawal et al. |
| 2025/0077120 A1 | 3/2025 | Ohba et al. |
| 2025/0150254 A1 | 5/2025 | Adir et al. |
| 2025/0167976 A1 | 5/2025 | Van Beirendonck |
| 2025/0247207 A1 | 7/2025 | Song et al. |
| 2025/0259042 A1 | 8/2025 | Crabtree et al. |
| 2025/0300806 A1 | 9/2025 | Vrubel et al. |
| 2025/0300807 A1 | 9/2025 | Vrubel et al. |

FOREIGN PATENT DOCUMENTS

| | | |
|---|---|---|
| CN | 116048811 A | 5/2023 |
| WO | 2025085808 A1 | 4/2025 |

OTHER PUBLICATIONS

A. Kim et al., "General Bootstrapping Approach for RLWE-Based Homomorphic Encryption," in IEEE Transactions on Computers, vol. 73, No. 1, pp. 86-96, Jan. 2024 (Year: 2024).*

(N.d.). Zama.Ai. Retrieved Aug. 8, 2025, from https://www.zama.ai/products-and-services/privacy-preserving-machine-learning-using-fully-homomorphic-encryption.

CryptoLab, & Niobium. (Oct. 10, 2024). CryptoLab and Niobium partner to bring guaranteed privacy to LLM and generative AI applications. Cision PR Newswire. https://www.prnewswire.com/news-releases/cryptolab-and-niobium-partner-to-bring-guaranteed-privacy-to-llm-and-generative-ai-applications-302273035.html.

FracTLcore® Compute Fabric. (Jan. 28, 2025). Cornami—Realtime Intelligent Computing for AI, Blockchain, and PPML Workloads with FHE; Fully Homomorphic Encryption, and Plaintext; Cornami, inc. https://cornami.com/fractlcore/.

Ligeti, R. (Oct. 22, 2020). Cornami achieves unprecedented 1,000,000x Acceleration to Deliver Real-Time Fully Homomorphic Encryption (FHE). Cornami—Realtime Intelligent Computing for AI, Blockchain, and PPML Workloads with FHE; Fully Homomorphic Encryption, and Plaintext; Cornami, inc. https://cornami.com/cornamis-president-ceo-wally-rhines-is-named-to-the-semiconductor-industry-hall-of-fame/.

Plataniotis□, K. (n.d.). Special issue on privacy and security challenges of generative AI. ITU. Retrieved Aug. 8, 2025, from https://www.itu.int/en/journal/j-fet/2025/003/Pages/default.aspx.

Rho, D., Kim, T., Park, M., Kim, J. W., Chae, H., Ryu, E. K., & Cheon, J. H. (2024). Encryption-Friendly LLM Architecture. In arXiv [cs.CR]. http://arxiv.org/abs/2410.02486.

Duong, Phap Ngoc, and Hanho Lee. "Pipelined Key Switching Accelerator Architecture for CKKS-Based Fully Homomorphic Encryption." Sensors (Basel, Switzerland) vol. 23,10 4594. May 9, 2023 (Year: 2023).

H. Nassar, L. Bauer and J. Henkel, "Turbo-FHE: Accelerating Fully Homomorphic Encryption With FPGA and HBM Integration," in IEEE Design & Test, vol. 42, No. 3, pp. 86-93, Jun. 2025 (Year: 2025).

S. Fan, et al., 2025. FAST: An FHE Accelerator for Scalable-parallelism with Tunable-bit. In Proceedings of the 52nd Annual International Symposium on Computer Architecture (ISCA '25). Association for Computing Machinery, New York, NY, USA, 92-106. (Year: 2025).

Xiao, Y., Liu, F.-H., Ku, Y.-T., Ho, M.-C., Hsu, C.-F., Chang, M.-C., Hung, S.-H., & Chen, W.-C. (2024). GPU Acceleration for FHEW/TFHE Bootstrapping. IACR Transactions on Cryptographic Hardware and Embedded Systems, 2025(1), 314-339. (Year: 2024).

J. Kim et al., "ARK: Fully Homomorphic Encryption Accelerator with Runtime Data Generation and Inter-Operation Key Reuse," 2022 55th IEEE/ACM International Symposium on Microarchitecture (MICRO), Chicago, IL, USA, 2022, pp. 1237-1254 (Year: 2022).

R. Agrawal, A. Chandrakasan and A. Joshi, "HEAP: A Fully Homomorphic Encryption Accelerator with Parallelized Bootstrapping," 2024 ACM/IEEE 51st Annual International Symposium on Computer Architecture (ISCA), Buenos Aires, Argentina, 2024, pp. 756-769 (Year: 2024).

* cited by examiner

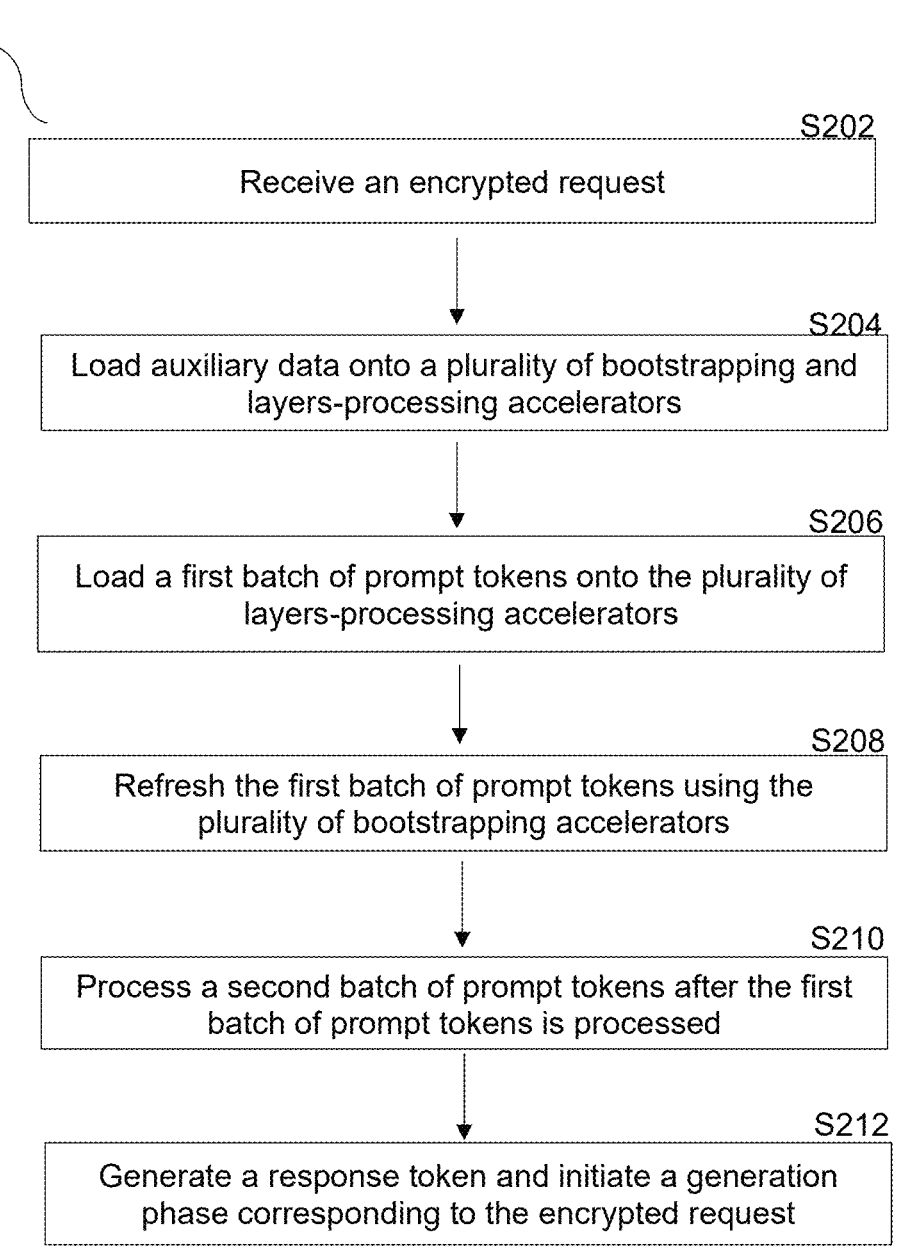

200

S202
Receive an encrypted request

S204
Load auxiliary data onto a plurality of bootstrapping and layers-processing accelerators S206
Load a first batch of prompt tokens onto the plurality of layers-processing accelerators S208
Refresh the first batch of prompt tokens using the plurality of bootstrapping accelerators S210
Process a second batch of prompt tokens after the first batch of prompt tokens is processed S212
Generate a response token and initiate a generation phase corresponding to the encrypted request

Process a plurality of generation-phase ciphertexts

S304

Apply a batch size fixed at compile time

S306

Transfer a segment of model data to device memory

S308

Execute homomorphic operations on the ciphertexts while concurrently retrieving a subsequent segment of the model data

MULTI-CHIP ACCELERATOR ARCHITECTURE FOR FULLY HOMOMORPHIC ENCRYPTION INFERENCE

INCORPORATION BY REFERENCE

The subject matter of the present application is related to and incorporates by reference the complete disclosures of the following pending applications: U.S. patent application Ser. No. 18/982,553 entitled "TECHNIQUES FOR OPTIMIZING BOOTSTRAPPING EXECUTION OF A FULLY HOMOMORPHIC ENCRYPTION," filed on Dec. 16, 2024, and U.S. patent application Ser. No. 18/767,049 entitled "OPTIMIZING BOOTSTRAP PROCESS BY MATRIX-COMPRESSION TECHNIQUE," filed on Jul. 9, 2024.

TECHNICAL FIELD

The present disclosure relates generally to privacy-preserving data-processing systems and, more specifically, to a multi-chip accelerator architecture for fully homomorphic encryption inference.

BACKGROUND

Fully homomorphic encryption (FHE) enables computation on data while the data is still encrypted. The Cheon-Kim-Kim-Song (CKKS) scheme is frequently employed because it supports approximate addition and multiplication on packed complex-number vectors with controlled noise growth. Within CKKS, each homomorphic multiplication increases ciphertext noise and consumes one or more residue-number-system (RNS) modulus prime. When the remaining primes are insufficient for the required precision, a bootstrapping procedure is invoked to restore the modulus chain. Bootstrapping can include an initial modulus-extension (sometimes called a modulus-raise) step, followed by Coefficient-to-Slots (C2S), evaluation of a non-linear polynomial such as a sine approximation, and Slots-to-Coefficient (S2C) stage.

Bootstrapping is resource-intensive. Auxiliary data, such as C2S/S2C diagonals and key-switching keys, may require several gigabytes of storage, far exceeding the on-chip memory available in contemporary accelerators. Consequently, existing designs repeatedly transfer this data from external memory, and the associated bandwidth becomes a significant execution bottleneck.

In privacy-preserving machine-learning inference, a single application can invoke hundreds or thousands of bootstraps, leading to substantial latency and increased power consumption. Bootstrapping is the dominant factor in end-to-end runtime, and its associated memory traffic often becomes the main performance bottleneck when considering deployment of real-time convolutional-neural-network or large-language-model workloads on FHE-enabled cloud platforms.

Common approaches rely on repeatedly loading the auxiliary data from off-chip memory, leaving the external-bandwidth constraint unresolved.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later.

A system of one or more computers can be configured to perform particular operations or actions by virtue of having software, firmware, hardware, or a combination of them installed on the system that in operation cause(s) the system to perform the actions. One or more computer programs can be configured to perform particular operations or actions by virtue of including instructions that, when executed by data processing apparatus, cause the apparatus to perform the actions.

Embodiments of the present disclosure may be provided as a network of communicating devices (i.e. a "computerized network"). Embodiments of the invention may be also provided as a software application downloadable into a computer device to facilitate the method. The software application may be a computer program product, which may be stored on a non-transitory computer-readable medium on a tangible data-storage device (such as a storage device of a server, or one within a user device).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a system may include a plurality of server modules. The system may also an interconnect operatively coupled to each of the plurality of server modules, the interconnect being configured to distribute session initialization data for a large language model session to the plurality of server modules. The system may furthermore a first plurality of application-specific integrated circuits s disposed on one or more of the plurality of server modules, each accelerator being configured to perform bootstrapping operations on ciphertexts during an initiation phase of the large language model session. The system may in addition a second plurality of application-specific integrated circuits disposed on the plurality of server modules, the second plurality of application-specific integrated circuits having: (i) bootstrapping circuitry configured to store auxiliary data used during the bootstrapping operations and to perform the bootstrapping operations on the ciphertexts; (ii) processing circuitry configured to perform homomorphic arithmetic operations other than the bootstrapping operations; and (iii) support circuitry configured to perform functions that support the bootstrapping circuitry and the processing circuitry. Other embodiments of this aspect include corresponding computer systems, apparatus, and computer programs recorded on one or more computer storage devices, each configured to perform the actions of the methods.

In one general aspect, a non-transitory computer-readable medium storing instructions may include distributing session-initialization data over an interconnect for a large-language-model session.—A non-transitory computer-readable medium storing instructions may also include operating a first plurality of application-specific integrated circuits to perform bootstrapping on ciphertexts during an initiation phase. Instructions may furthermore include operating a second plurality of application-specific integrated circuits by: (i) causing bootstrapping circuitry to store auxiliary data used during bootstrapping and to perform bootstrapping operations on ciphertexts; (ii) causing processing circuitry to perform homomorphic arithmetic operations other than bootstrapping; and (iii) causing support circuitry to perform functions that support the bootstrapping and processing circuitry. Instructions may in addition include where the system may include: a plurality of server modules, the interconnect operatively coupled to each of the server modules, the first plurality of application-specific integrated circuits disposed on one or more of the server modules, and the second plurality of application-specific integrated circuits disposed on the server modules. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings, in which:

FIG. 2 is a flowchart illustrating an initialization method for an encrypted request, in accordance with an embodiment of the present disclosure.

DETAILED DESCRIPTION

Figure 1:
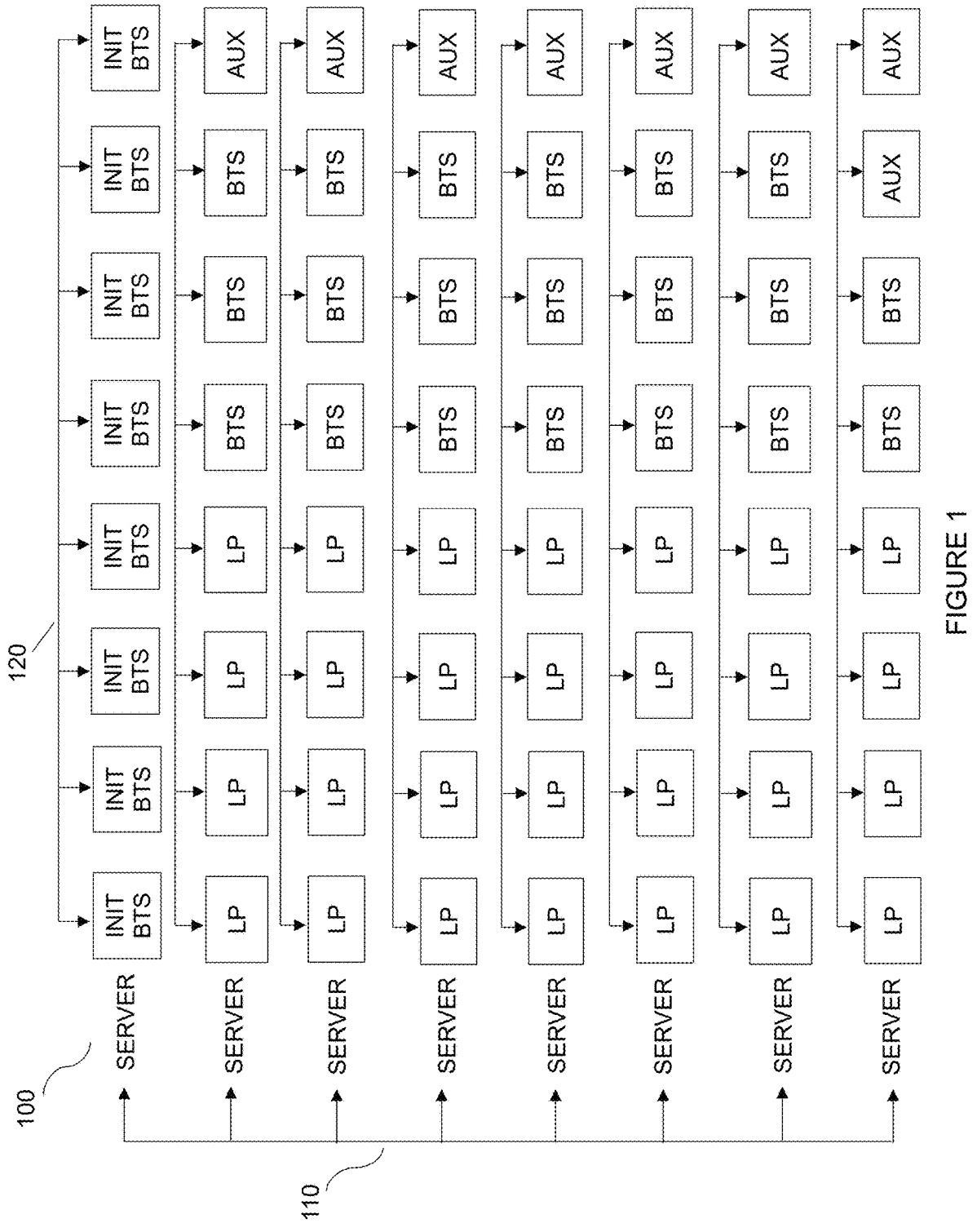
FIG. 1 is a schematic diagram illustrating a multi-chip fully homomorphic encryption (FHE) inference system, in accordance with an embodiment of the present disclosure.

It is important to note that the embodiments disclosed herein are only examples of the many advantageous uses of the innovative teachings herein and are not intended to be limiting in any way. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As used herein, the term "session" refers to the continuous processing interval during which all ciphertexts encrypted under a single user-specific FHE key set are handled by the system. A new session may begin when its first ciphertext is received and ends when the associated BTS accelerator or accelerators are reclaimed. When multiple users employ the same FHE key set, they may share a single session and may be processed by a one or more dedicated BTS accelerators; conversely, when users employ different key sets, each user may be assigned to its own session and to one or more dedicated BTS accelerators.

As used herein, the term "auxiliary data" (or "aux-data") refers to the collection of pre-computed artifacts (such as rotation keys, key-switching keys, modulus-extension tables, and diagonal matrices) required to perform a CKKS (or other lattice-based) bootstrapping procedure.

As used herein, the term "BTS accelerator" refers to a hardware block configured for bootstrapping (noise-refresh) operations and performing selected layers processing tasks such as polynomial approximations of non-linear activation functions; The BTS accelerator may store one session's compressed auxiliary data in on-die memory and may perform operations such as modulus raise, coefficient-to-slot conversion (C2S), non-linear evaluation, slot-to-coefficient conversion (S2C), and re-linearization with no, or reduced, external-memory access.

As used herein, the term "LP accelerator" refers to a hardware block dedicated to non-bootstrapping homomorphic arithmetic, including vector-matrix multiplication, slot rotation, rescaling, and activation functions used in machine-learning inference. The LP accelerator may employ an internal double-buffer mode so that weight transfer and computation overlap in time.

As used herein, the term "AUX unit" refers to an auxiliary subsystem that can perform ancillary functions such as, without limitation, decompression, format conversion, metadata aggregation, or other workload-specific services needed to support the BTS and LP accelerators.

As used herein, the term "interconnect" broadly encompasses any internal or external communication link (such as, without limitation, parallel buses, switched fabrics, mesh links, or point-to-point protocols such as PCIe or CXL) used to move data among server modules, accelerators, memory devices, or host processors.

As used herein, the term "compiler-generated timetable" (or "compile-time schedule") refers to a statically determined sequence of transfer slots, accelerator assignments, and buffer hand-offs produced by an offline code-generation tool; the schedule may eliminate or reduce run-time arbitration on the interconnect and ensures deterministic pipeline utilization.

The technical problems addressed by the disclosed subject matter revolve around achieving real-time, multi-user fully-homomorphic-encryption (FHE) inference in scalable compute deployments such as one or more data-center racks or a sub-rack system. The principal difficulties are: (a) the repeated transfer of multi-gigabyte auxiliary bootstrapping data from external memory before each noise-refresh, which exhausts bandwidth and increases latency; (b) each user's FHE key set requires unique auxiliary data, hindering effective sharing of bootstrapping processors among simultaneous user sessions; and (c) additional latency introduced when large plaintext model-weight segments are streamed from storage without being overlapped with homomorphic computation.

Some of the disclosed embodiments allow these technical challenges to be mitigated by: (a) compressing each user's auxiliary data and loading it once into on-chip memory of a bootstrapping processing circuitry that remains bound to that user for the duration of the session; (b) assigning single-chip server blades to either bootstrapping or non-bootstrapping roles and interconnecting them through a three-tier fabric that links (i) blades within a server, (ii) servers within a rack, and (iii) multiple racks; A deterministic, compile-time schedule then orchestrates ciphertext transfers across this hierarchy (i.e. system-wide, among all chips, blades, and nodes) to keep the aggregated pipeline continuously active. and (c) executing batches of ciphertexts while a double-buffer mechanism pre-fetches the next plaintext-weight segment, thus overlapping communication with computation and reducing effective transfer latency.

The technical solutions disclosed herein enable FHE deployments, ranging from a single blade to multi-rack installations, meet real-time latency targets while reducing memory bandwidth demands, the number of required chips or nodes, and power consumption: one-time loading of auxiliary data removes recurring DRAM traffic; balanced assignment of bootstrapping and layers-processing functions sustains near-peak utilization; and overlapping weight transfers with computation eliminates pipeline idle time, enabling high-throughput, cost-efficient FHE inference for machine-learning.

The disclosed techniques are described primarily with reference to CKKS, yet they are also applicable, with appropriate parameter selection, to other lattice-based FHE schemes such as BFV and BGV, and they may be adaptable to future schemes that employ auxiliary switching keys for noise management.

FIG. 1 is a schematic diagram illustrating a multi-chip fully homomorphic encryption (FHE) inference system 100, in accordance with an embodiment of the present disclosure. In the illustrated embodiment, the system 100 is shown as a single compute rack and includes eight horizontally arranged server modules that connect to a common backplane 110, depicted as a vertical trunk with horizontal branches that provide data to each module. However, in alternative embodiments of system 100, individual blades (nodes) may be connected directly to a top-of-rack Ethernet switch, or in other ways, for example, via a chassis fabric, an optical backplane, or other suitable interconnect; each rack may host other components such as a main server along with communication, power, and cooling hardware, and multiple racks may be interconnected by higher-level fabrics.

An ingress interconnect 120 (e.g., PCIe, Ethernet, or another high-bandwidth link) may convey session initialization data (ciphertexts, user metadata, and compressed auxiliary tables) to a row of initialization bootstrapping accelerators (INIT BTS) on the first module. INIT BTS refers to bootstrapping processors used during an algorithmic initiation phase of a large-language-model (LLM) session, that is, from receipt of the prompt tokens until generation of the first response token, during which the prompt tokens are repeatedly bootstrapped by those processors. A separate data-initiation step distributes the same session-specific auxiliary data to the dedicated BTS chip, so that chip holds exactly the same aux-data image as the INIT-BTS chip, and, when required, loads each LP accelerator with only the other auxiliary data it needs (which may partially overlap with the session image). When sufficient multiplication depth is available, a newly arrived ciphertext may bypass the INIT-BTS row and be processed first by an LP accelerator.

In another embodiment, such as a single-user deployment or multiple users sharing a common key-set, the system may dispense with separately designated INIT-BTS accelerators. In such cases the existing BTS accelerators handle both the prompt-processing phase and the subsequent generation phase, using the same on-chip auxiliary-data image.

Each server module also contains application-specific integrated circuits (ASICs) assigned to one of three functional roles: bootstrapping (BTS), layers processing (LP), or auxiliary (AUX). The mix of BTS, LP, and AUX devices is chosen to meet the relative demand for bootstrapping and other homomorphic operations observed in transformer-based inference workloads. In some embodiments, at the start of a new user session or at the beginning of a fresh prompt within an existing session, an ingress interconnect 120 (e.g., PCIe, Ethernet, or another high-bandwidth link) delivers session-startup data (ciphertexts, user metadata, and compressed auxiliary tables) to all INIT-BTS accelerators on the first module. These INIT-BTS accelerators may process the algorithmic-initiation phase of a large-language-model (LLM) workload (that is, the interval from receipt of the prompt tokens until generation of the first response token) during which the prompt ciphertexts are repeatedly bootstrapped. In the illustrated eight-chip configuration, dedicating all eight INIT-BTS chips may allow eight prompt tokens to be processed in every transformer cycle, achieving a short time-to-first-token before the user session transitions to the generation phrase and joins the multi-user generation pipeline, which produces approximately one token per cycle; the INIT-BTS chips remain dedicated for prompt processing of other sessions or additional prompts of the same session.

In some embodiments, a separate data-initiation step distributes the same session-specific auxiliary data (e.g., rotation keys, key-switching keys, modulus-extension tables) to the dedicated BTS chip that will serve the generation phase and, when required, supplies each layers-processing (LP) accelerator with only the other auxiliary data it needs, which may partially overlap with the session image. With the auxiliary tables resident in on-chip static RAM (SRAM), subsequent bootstrapping cycles avoid external DRAM traffic. When a newly arrived ciphertext retains sufficient multiplication depth, it may bypass the INIT-BTS row and be processed first by an LP accelerator.

In some embodiments, each remaining server module is a mixed-function module that integrates three categories of ASICs. For example, four layer-processing accelerators (LP) may generate a primary arithmetic throughput. Each LP may include a wide single-instruction, multiple-data (SIMD) engine and on-chip buffers sized to hold ciphertext vectors together with a working set of plaintext weights. The LP is configured to execute vector-matrix multiplication, slot rotation, rescaling, activation, and other functions that together constitute the non-bootstrapping portion of transformer inference.

In some embodiments, three dedicated bootstrapping accelerators (BTS) may be provided per mixed-function module. Each BTS stores a compressed auxiliary-data image for one active session in its SRAM and performs modulus adjustment, coefficient/slot transforms, and re-linearization entirely on-chip, without or with reduced access to DRAM. With DRAM fetches removed, bootstrapping speed is determined by the BTS chip's arithmetic capacity rather than memory-interface bandwidth. Upon session termination or after a predefined inactivity interval, supervisory firmware may optionally clear the auxiliary data stored in the BTS SRAM and return the accelerator to an unassigned resource set.

In some embodiments, the multi-device architecture that dedicates one or more accelerators to bootstrapping is equally applicable to machine-learning workloads other than transformer inference. For example, in a convolutionalneural-network (CNN) used for image classification, such as a ResNet architecture, one or more layers-processing (LP) accelerators may execute the convolution, pooling, and fully connected layers, while one or more dedicated bootstrapping (BTS) accelerators refresh intermediate ciphertexts whenever their noise budget approaches a predefined threshold. The BTS accelerators may additionally evaluate activation functions or other non-linear operations required by the network. Accordingly, the techniques disclosed herein can be employed across a wide range of FHE-based machine-learning applications In one illustrative configuration, a baseline mix of four LP accelerators, three BTS accelerators, and one AUX unit per module provides a practical balance between bootstrapping throughput and arithmetic throughput for transformer-style workloads. Since the computational load per model coefficient grows linearly with the number of prompt or generation tokens processed in parallel, batching is used to balance that load against available external-memory bandwidth. Once this balance is set, the required number of BTS accelerators scales with the number of concurrently processed tokens. As a general rule, additional LP accelerators can be beneficial without adding extra BTS accelerators so long as the LP compute time between bootstraps exceeds the bootstrap time itself. Accordingly, alternative LP-to-BTS ratios may be selected to match: i) the computational load per model coefficient (which grows with the number of tokens batched for concurrent processing); ii) external-memory bandwidth constraints; iii) the desired balance between LP compute time and BTS bootstrapping time. In some embodiments, security parameters may affect per-coefficient computational load.

Within each server module the ASICs may be coupled by an on-board high-bandwidth fabric, such as a crossbar or multi-lane data bus, dimensioned to sustain the compile-time traffic pattern. In one embodiment a compiler pre-allocates transfer slots for each ciphertext, allowing the fabric to forward data generally without complex run-time arbitration.

A representative session flow may proceed as follows: (i) At the start of a new user session or at the beginning of a fresh prompt the ingress interconnect 120 (e.g., PCIe, Ethernet, or another high-bandwidth link) delivers session initialization data (ciphertexts, user metadata, and a compressed auxiliary-table image) to all INIT-BTS accelerators. Each INIT-BTS chip loads the auxiliary tables into on-chip SRAM; During the same window the same auxiliary-data image is delivered to the dedicated BTS chip that will serve the generation phase, and each layers-processing (LP) accelerator receives only the additional auxiliary data it requires, which may partially overlap with the session image. With the auxiliary data resident locally, the INIT-BTS accelerators immediately begin bootstrapping the prompt ciphertexts. During this prompt-to-first-token window the eight INIT-BTS chips can bootstrap eight prompt tokens per transformer cycle, after which the user session transitions into the multi-user generation pipeline, while the INIT-BTS chips remain dedicated for prompt processing of other sessions. ii) The refreshed ciphertexts (tokens) are duplicated and loaded into every LP accelerator across all mixed-function modules. Concurrently, the weights of the first transformer layer or a portion thereof is partitioned into twenty-eight weight-block chunks and loaded concurrently into the twenty-eight LP accelerators, one chunk per chip. iii) Each LP accelerator multiplies every token by its resident chunk while the next chunk is DMA-loaded into the idle half of the chip's internal double buffer. When multiplication on the current chunk completes, the buffer halves swap and the chip immediately begins multiplying the tokens by the newly loaded chunk; a third chunk is then fetched, and the compute-while-load sequence repeats until all chunks of the layer have been processed. Additional per-ciphertext or cross-ciphertext operations are executed on the LP chips or on an auxiliary (AUX) unit; if a ciphertext's noise budget falls below a threshold at any point, it is pipelined to the session's dedicated BTS accelerator for bootstrapping and then returned to the LP pipeline. Bootstrapping may likewise be invoked during chunk processing whenever the noise budget becomes critical. (iv) Steps in item (iii) execute concurrently across all mixed-function modules; each module performs its portion of the workload in parallel until every layer of the model is complete (v) A management controller tracks activity counters in every BTS; when a session remains inactive beyond a configurable timeout, the controller overwrites the device's SRAM, clears the session mapping, and returns the BTS to the unallocated resource set, from which it can be redeployed for a new user. Dynamically repurposing a BTS as an LP accelerator would require closing all active sessions and loading a new program into the system and is therefore optional and deployment-specific.

To implement the timeout action of step (v), the rack-level management controller maintains, for each BTS accelerator, a "last-seen" timestamp that is refreshed whenever a ciphertext for that session arrives on backplane 110. During periodic housekeeping cycles the controller subtracts this timestamp from the current system time; if the elapsed idle period exceeds a programmable inactivity threshold (e.g., $30s$ or a fixed number of rack cycles), the controller classifies the session as inactive, may issue a command to clear the accelerator's on-die SRAM containing the compressed auxiliary data, deletes the corresponding entry in its session-to-accelerator table, and returns the now-stateless device to the free pool, where it can be reloaded for a new user or reassigned as an LP accelerator according to compile-time demand.

The embodiment illustrated in FIG. 1 contains 64 accelerators (28 LP, 20 BTS, 8 INIT BTS, and 8 AUX units). At a nominal 1 GHz clock, simulations indicate that this configuration can meet sub-second first-token latency targets for approximately twenty concurrent users on a relevant transformer model. The arrangement provides several technical advantages: i) User-dedicated BTS devices permit a one-time load of each user's unique auxiliary data, eliminating repetitive DRAM fetches during subsequent bootstraps; ii) Parallel, chunk-wise layer processing across all LP accelerators allows many tokens to be multiplied by model coefficients while double-buffered weight streaming hides external-memory latency, mitigating the bandwidth bottleneck; iii) Multiple INIT-BTS accelerators assigned to the new prompt process several prompt tokens per transformer cycle, sharply shortening time-to-first-token; iv) An adjustable ratio between INIT-BTS and LP accelerators lets the system adapt to different prompt-to-response workloads and further adjust first-token latency; v) An adjustable ratio between BTS and LP accelerators accommodates varying computational load per model coefficient, external-memory bandwidth limits, and load-balancing between LP compute time and BTS bootstrap time.

FIG. 2 is a flowchart illustrating an initiation method 200 for processing an encrypted request, in accordance with an embodiment of the present disclosure. In some embodiments, the method 200 is executed by processing circuitry within the FHE inference system of FIG. 1.

At S202, an encrypted request is received by an FHE inference system. In some embodiments, an entire set of prompt-phase ciphertexts for a new user session may arrive over an ingress interconnect (e.g., PCIe, CXL, or Ethernet as shown in FIG. 1). Each ciphertext may be tagged with a session identifier derived from the user-specific FHE key set, together with optional user metadata, so that downstream hardware preserves per-user ordering as the tokens fan out across the multi-chip fabric.

At S204, auxiliary data is loaded into a plurality of bootstrapping and layers-processing (LP) accelerators. In some embodiments, session-specific auxiliary data (such as rotation keys, key-switching keys, and modulus-extension tables) is first loaded into every initialization bootstrapping accelerator (INIT-BTS), i.e., a dedicated row of prompt-processing chips as shown in FIG. 1. If the user is new, the same auxiliary-data image is distributed to dedicated BTS chips so that it holds exactly the same aux-data image as the INIT-BTS chips, and each layers-processing (LP) accelerator is loaded with only the additional auxiliary data required for its assigned homomorphic operations, which may partially overlap with the session image.

At S206, a first batch of prompt tokens are loaded onto the LP accelerators. In some embodiments, an initial eight prompt-phase ciphertexts may be duplicated into every LP accelerator across all mixed-function modules, where they begin a transformer cycle alongside generation-phase tokens from other users. In some embodiments, while this transformer cycle executes, weight blocks for the current layer stream into each LP accelerator's double-buffered on-chip memory, enabling a "compute-while-load" schedule in which arithmetic and data transfer overlap, allowing computation to proceed without external-memory stalls.

At S208, the first batch of prompt tokens are refreshed by the plurality of bootstrapping accelerators. In some embodiments, throughout the current transformer cycle, the INIT-BTS row may repeatedly bootstrap the tokens currently resident in the pipeline, restoring each ciphertext's noise budget entirely on-chip. If a dedicated BTS chip is present, it can refresh one additional token, enabling up to nine prompt tokens per cycle without or with reduced external-memory traffic. Once refreshed, the first batch is processed by the LP accelerators. In some embodiments, this processing is carried out on each LP accelerator, which applies vector-matrix multiplication, slot rotation, rescaling, and point-wise activation on the tokens, thereby completing the transformer cycle. At S210, a second batch of prompt tokens are processed after the first batch is processed In some embodiments, the next eight (or nine) prompt tokens are then loaded into every LP accelerator, and a new transformer cycle begins under the same compute-while-load schedule. This batch-and-process sequence may repeat until all prompt tokens for the session have traversed the full transformer stack.

At S212, a response token is generated and a generation phase corresponding to the encrypted request is initiated. In some embodiments, once the final prompt batch completes, the first response token is emitted and the session joins the multi-user generation pipeline, which typically produces about one token per cycle. In some embodiments, the INIT-BTS accelerators are released to handle prompt processing for other sessions, while the dedicated BTS chip continues to perform any bootstraps required during generation.

Figure 3:
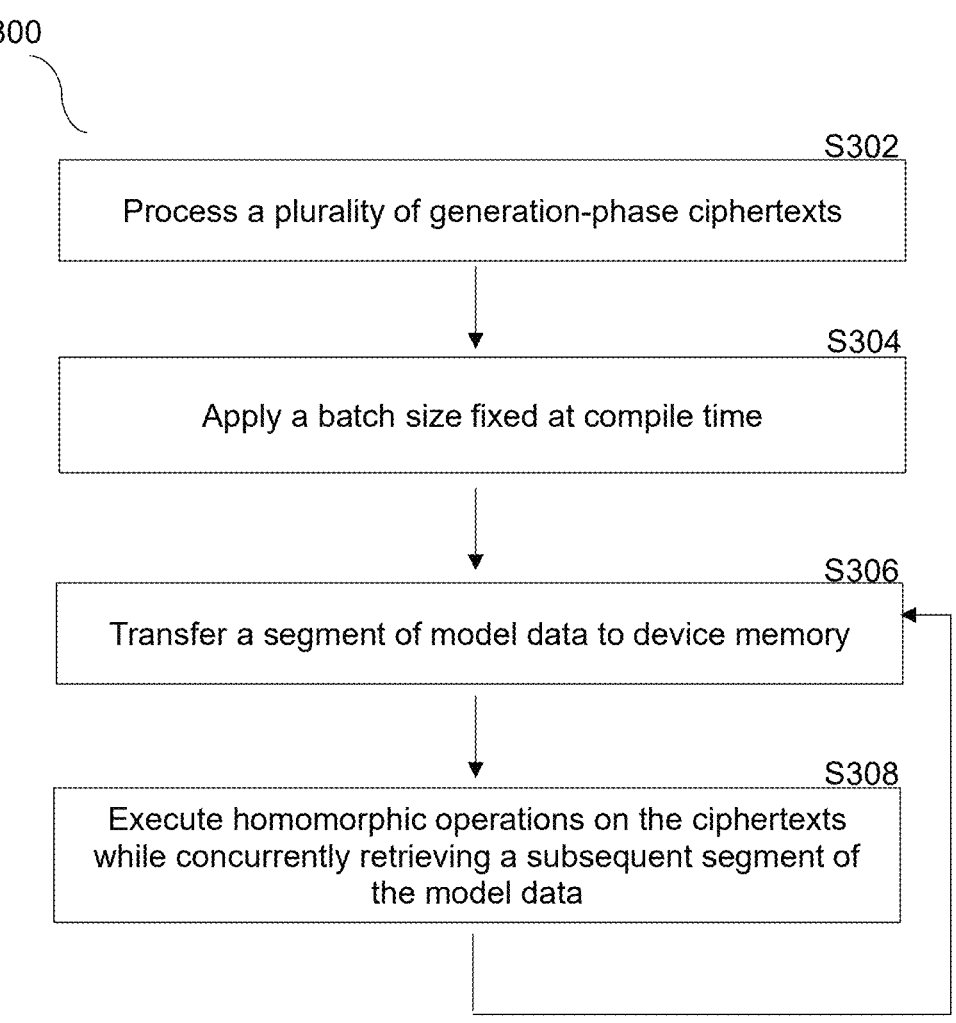
FIG. 3 is a flowchart illustrating an example batch processing method in which initiation-phase ciphertexts and generation-phase ciphertexts are processed concurrently, in accordance with an embodiment of the present disclosure.

FIG. 3 is a flowchart 300 illustrating an example batch processing method in which initiation-phase ciphertexts and generation-phase ciphertexts are processed concurrently, in accordance with an embodiment of the present disclosure.

At S302, a plurality of generation-phase ciphertexts is processed. Generation-phase ciphertexts may refer to the encrypted tokens produced inside the FHE inference system once the prompt-processing (initiation) phase has completed; In embodiments, the model emits one such token per transformer cycle. In some embodiments, each generation token inherits the session identifier assigned during the initiation phase, allowing the inference system to maintain per-user ordering as the tokens move through the multi-chip pipeline. In some embodiments, all users whose requests are actively being processed, including any single user still in the initiation phase, retain their allocated resources until their responses are complete. New prompts from users that are already active, but not currently in an ongoing response, may enter a queue and wait until an INIT-BTS resource becomes available.

At S304, a batch size K fixed at compile-time is applied. The batch size K may define the number of ciphertexts that will be processed in parallel through the next transformer layer so that all K ciphertexts reuse the same plaintext-weight block. The value K may be selected during program compilation (prior to run-time) based on on-chip buffer capacity, external-memory bandwidth, and latency targets. Once chosen, K may remain constant for the lifetime of the compiled workload, or in certain embodiments, may be updated during run-time, and is not constrained by the SIMD-lane width of the LP accelerators. K may be sized large enough to keep each LP accelerator busy while the next weight chunk is being fetched, thereby allowing computation to overlap with data transfer.

At S306, a segment of model data is transferred to device memory. In some embodiments, the segment of model data comprises plaintext-weight blocks. The plaintext-weight blocks may be approximately 50 MB, representing a partitioned chunk of a transformer layer L, or a part thereof. A direct-memory-access (DMA) engine may transfer these weight blocks from external storage into the idle half of the LP accelerators' internal double buffers, providing core-clock-speed access for the ensuing arithmetic. When the load completes, computation on these chunks can begin immediately while the next group of chunks is fetched into the opposite half of the buffers, enabling continuous overlap between data transfer and processing.

At S308, homomorphic operations are executed on the batched ciphertexts while a subsequent segment of model data is retrieved. Using the plaintext-weight blocks that now resides in device memory, the layers-processing (LP) accelerators apply homomorphic operations (e.g. vector-matrix multiplication, slot rotation, rescaling, and point-wise activation) to all K ciphertexts in the batch. In some embodiments, the timing of each bootstrapping operation is determined at compile time; consequently, no run-time control logic is required to decide when a refresh occurs. In some embodiments, all ciphertexts in the batch follow the same processing path and are bootstrapped together: when the compile-time schedule reaches the predefined refresh point, the entire batch is routed to the session's dedicated BTS accelerator, refreshed simultaneously, and then returned to the LP accelerators, thereby maintaining batch alignment.

In parallel, a DMA engine may retrieve the subsequent segment of model data by refilling the idle half of the LP accelerator's internal double buffers with the plaintext-weight blocks the next chunk of the current transformer layer L or, once that layer is complete, the first chunk of the following transformer layer L+1. Since arithmetic and data transfer proceed in parallel, the datapaths remain fully utilized and external-memory latency is effectively overlapped. When processing of layer L or layer chunk finishes, a buffer-selection switch within each LP accelerator exposes the freshly loaded weight block for the next layer's chunk or the next layer L+1, and control returns to S306 to repeat the transfer-and-compute cycle. Steps S306 and S308 loop until every layer of the transformer model has been evaluated for each ciphertext in the batch. The completed ciphertexts are then removed from the batching queue and sent to the system's output stage, where they can be decrypted by an authorized party or, if needed, undergo additional homomorphic post-processing.

Outside the batch loop, an idleness check may be performed for each BTS accelerator by comparing the current time with its last-seen timestamp. When the idle period exceeds the configurable inactivity threshold (e.g., thirty seconds), process 300 overwrites the accelerator's on-chip auxiliary data, removes the session entry from the scheduling table, and returns the reclaimed hardware to the free pool.

Figure 4:
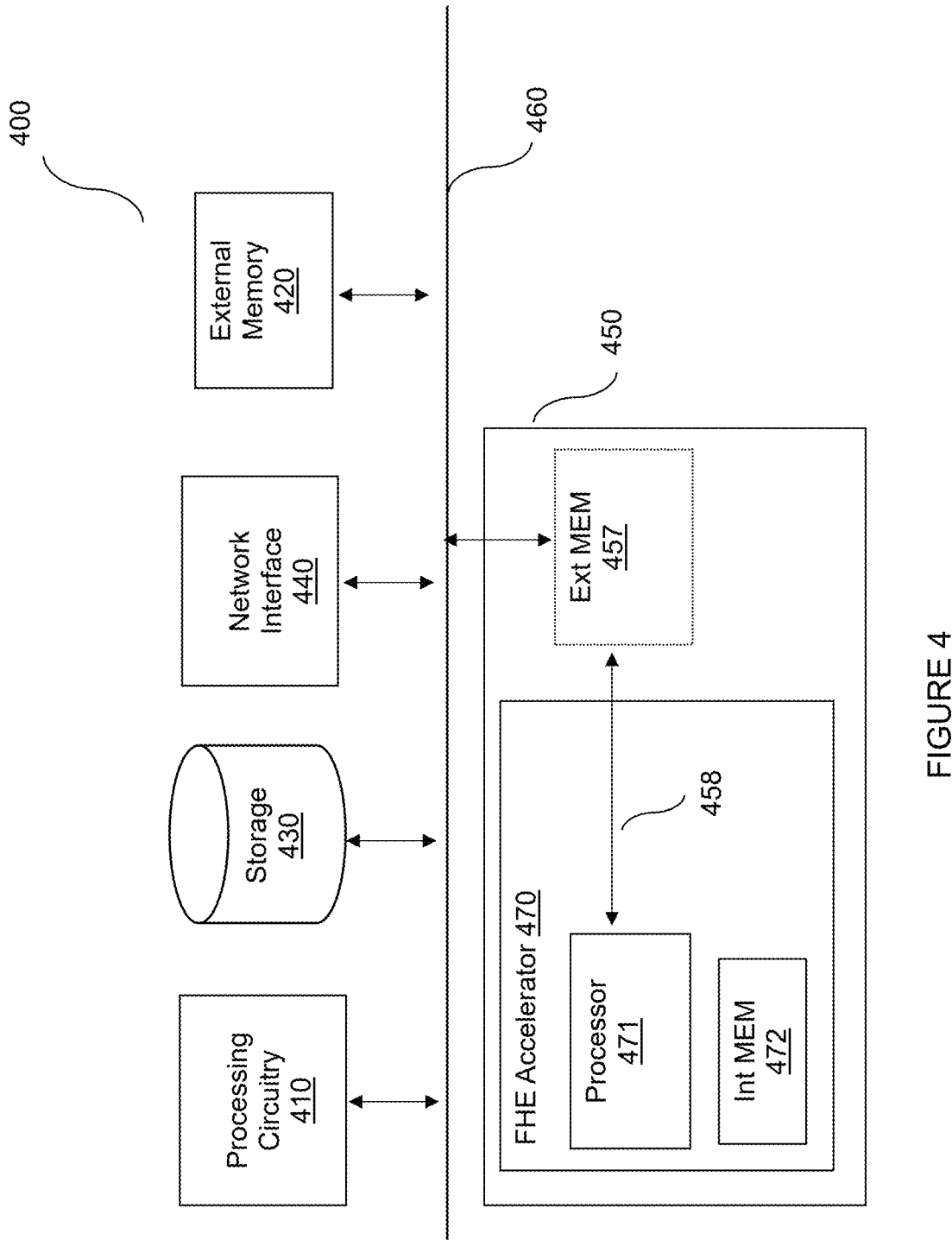
FIG. 4 is a block diagram of an accelerator chassis incorporating an FHE accelerator, in accordance with various embodiments of the present disclosure.

FIG. 4 is a block diagram of an accelerator chassis 400 incorporating an FHE accelerator, in accordance with various embodiments of the present disclosure. The accelerator chassis 400 includes a processing circuitry 410 coupled to a system memory 420, a storage 430, a network interface 440, and an FHE card 450. In one embodiment, the components of chassis 400 may be communicatively connected via a high-bandwidth interconnect 460 (e.g., PCIe, CXL, or a similar fabric).

It should be understood that the term "accelerator chassis 400" is used herein in a functional sense and is not limited to a particular host-processor topology. In some embodiments, the chassis 400 comprises only accelerator blades or cards and is managed by an external host server that executes the application and issues management commands. In other embodiments, the chassis 400 further includes one or more host processors that both execute the application workload and coordinate the local accelerator blades. Any of the foregoing configurations fall within the scope of the present disclosure.

The processing circuitry 410 may be realized as one or more hardware-logic components and circuits. In the rack-scale system of FIG. 1, each FHE accelerator 470 (and its on-die processor 471) may be fabricated from identical silicon and can be configured at compile-time for either a layers-processing (LP) role or a bootstrapping (BTS) role. By contrast, the processing circuitry 410 may execute an application workload (e.g. an FHE program that is described below with reference to system memory 420) and manage the accelerator chassis. For example, and without limitation, illustrative types of hardware-logic components that can be used include field-programmable gate arrays (FPGAs), application-specific integrated circuits (ASICs), application-specific standard products (ASSPs), system-on-a-chip (SoC) systems, graphics processing units (GPUs), tensor processing units (TPUs), general-purpose microprocessors, microcontrollers, digital signal processors (DSPs), and the like, or any other hardware-logic components capable of performing calculations or other manipulations of information.

System memory 420 may be volatile (e.g., random-access memory), non-volatile (e.g., read-only memory, flash memory), or a combination thereof. Storage 430 may include non-volatile memory devices, magnetic-disk drives, optical-disk drives, tape drives, and similar devices. Examples of system memory 420 may include EEPROM, ROM, PROM, RAM, DRAM, SRAM, flash memory, firmware, programmable logic, and so on. Storage 430 may comprise internal storage, attached storage, and/or network-accessible storage. The network interface 440 allows accelerator chassis 400 to communicate with external systems, utilizing various communication protocols.

System memory 420 and/or storage 430 may store software required to execute an FHE program or application, that is, software that requires the execution of an FHE scheme to perform one or more homomorphic operations. The interconnect 460 may include, for example, a PCIe or CXL bus.

The FHE program involves repetitive execution of the bootstrapping process, which, according to the disclosed embodiment, is performed by the FHE accelerator 470. When the same silicon is configured as an LP engine, the accelerator instead executes vector-matrix arithmetic; the hardware blocks are thus role-agnostic at manufacture time. Software should be construed broadly to include any type of instructions, whether referred to as software, firmware, middleware, microcode, hardware-description language, or otherwise. Instructions may include code in various formats, such as source code, binary code, executable code, or any other suitable format.

FHE card 450 is configured to rapidly perform complex homomorphic operations. The card can be installed in accelerator chassis 400 or operate as a standalone device. The card includes the FHE accelerator 470.

The FHE accelerator 470 includes a processor 471 and an internal memory 472, or multiple processors with internal memory, designed to accelerate FHE-scheme computational tasks. Processor 471 may include multiple cores capable of managing multiple computation threads simultaneously. Internal memory 472 is dedicated to storing data for executing the FHE program, such as auxiliary data, evaluation keys, indeterminate data, and the like. Internal memory 472 is designed for high bandwidth, enabling quick access to stored data, and is realized as on-die memory.

In one embodiment, the FHE accelerator 470 can be realized as an ASIC. In other embodiments, it can be realized as an FPGA, ASSP, SoC, or other hardware-logic components capable of performing calculations or other manipulations of information.

The FHE card 450 also includes external memory 457 and a memory bus 458, which serves as the interface through which processor 471 communicates with external memory 457. Typically, external memory 457 is SDRAM, high-bandwidth SDRAM (e.g., GDDR6), or high-bandwidth memory (HBM).

FHE card 450 also includes an interface to connect with interconnect 460. As noted, interconnect 460 may be PCIe, CXL, or a similar high-speed link.

According to the disclosed embodiments, the size of internal memory 472 is significantly smaller than that of external memory 457. Internal memory 472 is considered "on-die" memory, and the data stored there allows for the efficient execution of an FHE scheme, specifically the bootstrapping process of such a program. For example, the difference between the memory size of external memory 457 and internal memory 472 may be of an order of magnitude. In current technologies, the size of internal memory 472 is limited to ~1 GB; increasing this size would reduce the number of compute resources that can be placed on the die.

The bootstrapping process is usually complex and requires significant computational and memory resources. Specifically, a typical FHE bootstrapping process would require about 10 GB of memory in addition to the memory needed for executing other parts of the FHE program.

Currently, in existing solutions, data and auxiliary data used for bootstrapping are saved and repetitively loaded from system memory 420 or external memory 457 to internal memory 472 during the execution of bootstrapping. In a typical program, bootstrapping occurs hundreds to thousands of times.

The disclosed embodiments describe a method for efficient execution of the bootstrapping process. To achieve this, auxiliary data required for the process is loaded from system memory 420 or external memory 457 to internal memory 472 only once. However, the size of internal memory 472 is limited, so the disclosed embodiments ensure the size of the auxiliary data is optimized while maintaining optimal performance for the entire FHE program.

The auxiliary data typically includes evaluation keys and data used for the computation of homomorphic I-DFT and DFT algorithms during the C2S and S2C steps of bootstrapping. Typically, such data includes diagonals of matrices used for the computation. The reduction is achieved using one or more data-reduction techniques discussed below. The various disclosed embodiments can reduce the size of the auxiliary data required for bootstrapping from ~10 GB to less than 1 GB.

It should be understood that the embodiments described herein are not limited to the specific architecture illustrated in FIG. 4, and other architectures may be used without departing from the scope of the disclosed embodiments.

Figure 5A:
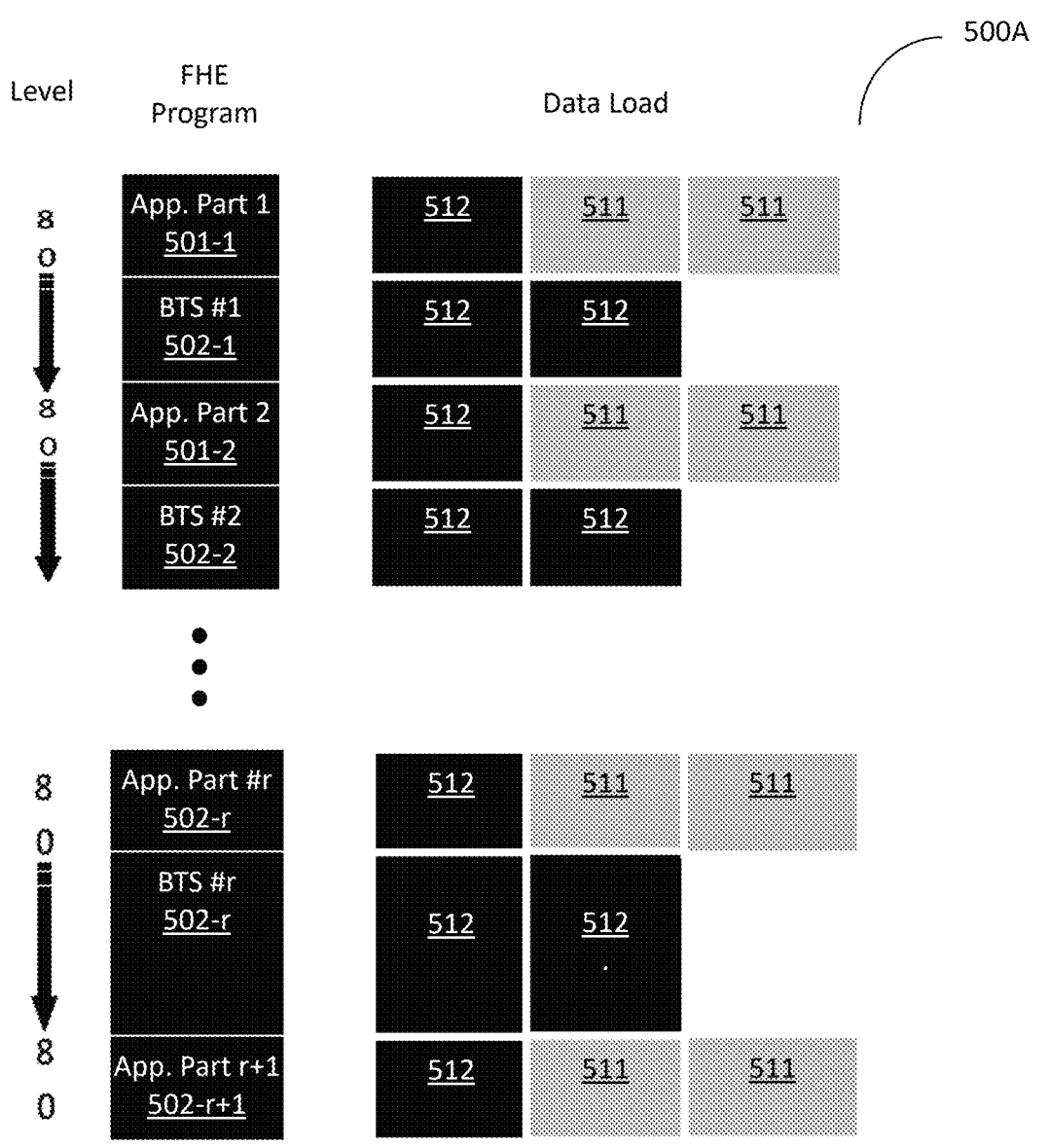
FIG. 5A is a diagram illustrating repeated data loads before each bootstrapping operation, in accordance with prior techniques.
Figure 5B:
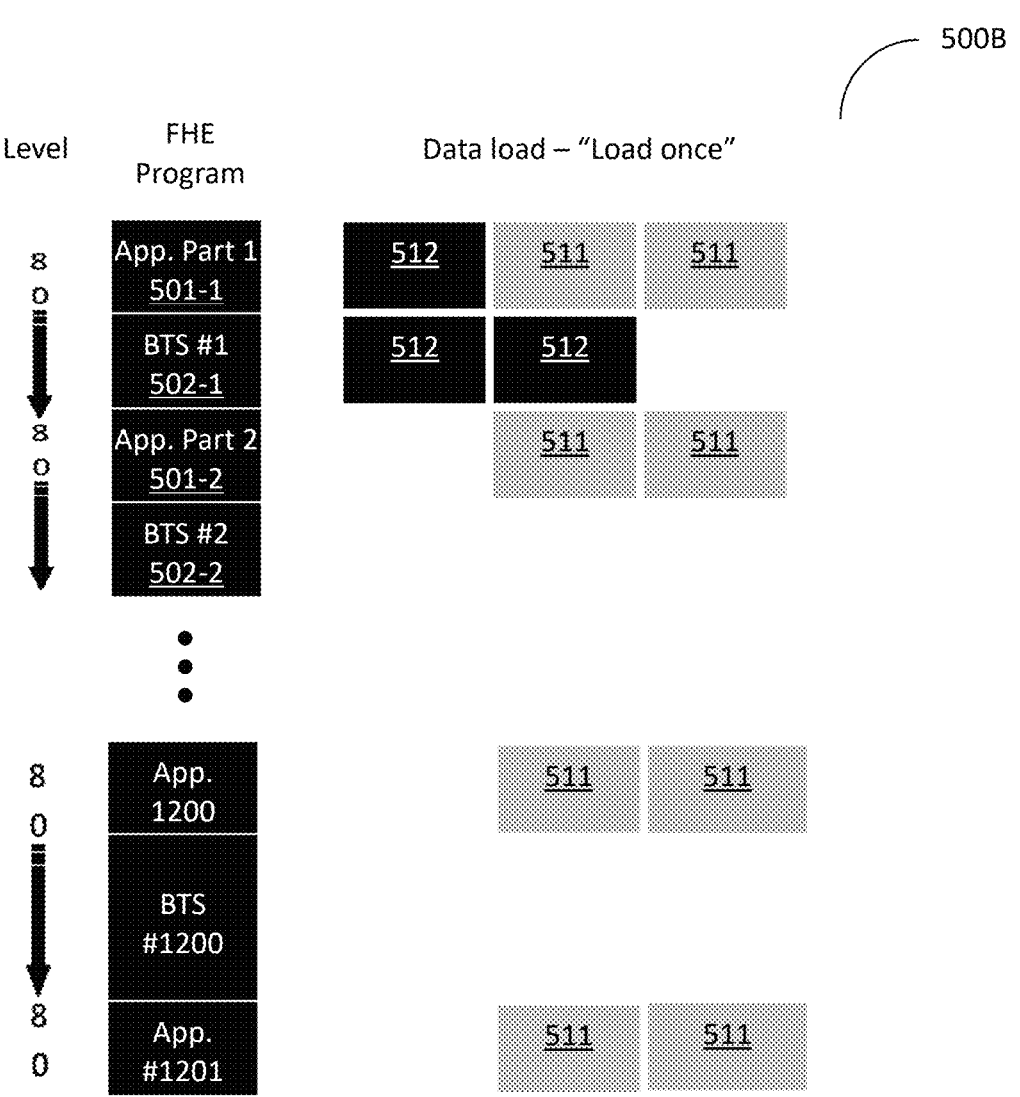
FIG. 5B is a diagram illustrating a single data load reused for bootstrapping operations, in accordance with an embodiment of the present disclosure.

FIGS. 5A and 5B show an example of data loading during a run of the FHE program 500. The FHE program 500 is composed of application parts 501-1 . . . 501-(r+1) (where r is an integer equal to or greater than 1), which provide the computation for the task required by the program. The bootstrapping processes 502-1 . . . 502-r are also performed during execution. In the disclosed rack-scale architecture, bootstrapping stages are mapped to dedicated BTS accelerators, while application parts are mapped to LP accelerators, under a compile-time schedule. A bootstrapping process is executed when the noise level increases and is typically scheduled as part of the coding of FHE program 500 by the programmer or an automated compiler.

FIG. 5A is a diagram illustrating repeated data loads before each bootstrapping operation, in accordance with prior techniques. At each run of an application part 501-i (where i=1, . . . , r+1), compute data 511 is loaded into the internal memory of the accelerator. The compute data 511 is unique and required for the computation of the respective application part, for example, a layer of an AI model. At each run of the bootstrapping process 502-i, repetitive data 512 is loaded into the internal memory of the accelerator. Repetitive data 512 includes auxiliary data (e.g., key-switching keys, rotation keys) that is identical across all bootstraps for the same user session.

FIG. 5B is a diagram illustrating a single data load that is reused for all bootstrapping operations, in accordance with an embodiment of the present disclosure. At each run of an application part 501-i, compute data 511 is loaded into the memory of an accelerator. The compute data 511 is unique and required for the computation of the respective application part. According to the disclosed embodiments, for all runs of the bootstrapping process 502-1 . . . 502-r, repetitive data 512 is loaded only once into the internal memory 472 of the accelerator and thereafter re-used, because each BTS accelerator retains a compressed auxiliary-data image that remains resident for the duration of the user session.

It should be noted that repetitive data 512 is smaller in size than what is typically used in the FHE program. The reduction in the size of repetitive data 512 is achieved using one or more auxiliary-data optimization techniques. These techniques include, but are not limited to, matrix-diagonal compression, sparse-to-dense KSK compression, KSK size reduction, and key reuse. In preferred embodiments these optimizations reduce the auxiliary-data memory requirement from approximately 10 GB to less than 1 GB, enabling the load-once strategy illustrated in FIG. 5B.

Figure 6:
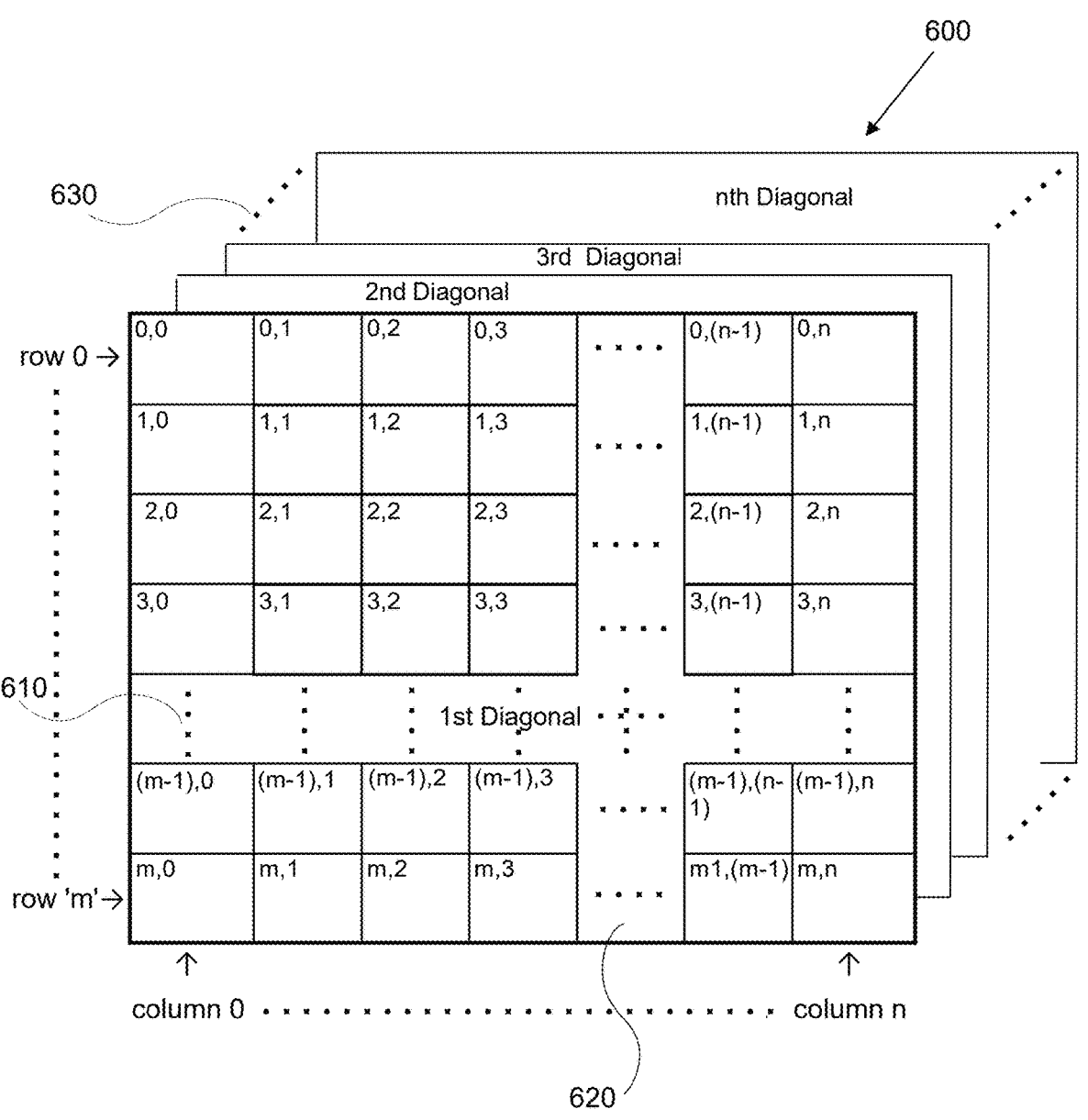
FIG. 6 is a diagram illustrating a diagonal-wise matrix for compressed auxiliary data in polynomial space, in accordance with an embodiment of the present disclosure.

FIG. 6 is a diagram illustrating a diagonal-wise matrix 600 for compressed auxiliary data in polynomial space, in accordance with an embodiment of the present disclosure. Matrix 600 is a three-dimensional (3D) Matrix, featuring traditional rows and columns as well as a depth dimension. Each depth dimension, henceforth referred to as a "diagonal 630," also consists of (m) rows and (n) columns, with the number of rows as the number of residues and the number of columns as the number of coefficients. For example, cell 1,3 in the $2^{nd}$ diagonal depth refers to coefficient index 3, residue index 1 of the $2^{nd}$ diagonal.

In embodiments using the RNS representation, in each diagonal the coefficients are associated with the columns and the residues with the rows of Matrix 600. Thus, the number of columns (n) may be equal to the number of coefficients, while the number of rows (m) may be equal to the number of residues. For example, Matrix 600 incorporating a C2S auxiliary-data matrix may have 56 residues, i.e., (L+K) polynomial residues, whereas Matrix 600 incorporating a S2C auxiliary-data matrix may have 28 residues.

It should be noted that Matrix 600 is presented as a three-dimensional (3D) matrix for the mathematical convenience of representing a plurality of diagonals (2D matrices) in the same space. Yet, it will be appreciated that each diagonal represents a different polynomial, a section of a polynomial, and the like, or any combination thereof.

During the initialization process of the FHE program, auxiliary data is loaded to FHE card 450 (see FIG. 4). The auxiliary-data matrices are required for the C2S and S2C steps of the bootstrapping process.

To facilitate bootstrap, the C2S auxiliary data (used for the IDFT in the C2S step) and the S2C auxiliary data (used for the DFT in the S2C step) are encoded from complex-space matrices into auxiliary-data polynomial-space matrices such as matrix 600. Polynomial space with integer coefficients allows efficient arithmetic in the NTT domain. Moreover, due to high modulus values, the RNS representation is used in the diagonals to reduce computation overhead.

It should be noted that the illustration of matrix 600 refers to both C2S and S2C; that is, there are two matrices: one comprising C2S auxiliary data and the other S2C auxiliary data. For ease of explanation, the description of matrix 600 applies to both unless otherwise noted.

The process of encoding to polynomials set of matrices can further include decomposing the set of matrices into p sub-matrices utilizing Cooley-Tukey matrix factorization $A = \Pi_{i=1}^{p} M_i$. While the original A is fully populated, $M_i$ are much sparser. For example, if n=215 and ρ=3 sub-matrices, the number of nonzero diagonals may be, for example, 32 for the $1^{st}$ sub-matrix, 63 for the $2^{nd}$ sub-matrix, and 63 for the $3^{rd}$ sub-matrix totaling 158 diagonals compare to 215 for ρ=1.

All sub-matrices have the same formation as matrix 600; however, the number of diagonals per sub-matrix may vary. The number of sub-matrices is greater than one and typically does not exceed five. For each diagonal 630, columns 620 are populated by integer coefficients corresponding to the residue-polynomial term (exponent equivalent) defined in rows 610.

Typically encoded diagonals for the C2S step would use the full RNS base (maximum allowable modulus). In a typical setting of 128-bit security with $N=2^{16}$ and $\log_2 QP_{max}=1550$, thus the maximum modulus is approximately $Q\approx2^{1550}$.

The RNS breakdown transforms each number modulo Q into L+K residues modulo smaller moduli, typically smaller than a 32-bit word, thus $L+K\approx56$ for the C2S step. On the other hand, since numerous levels have already been utilized in the S2C stage, the value of L+K is approximately reduced to L+K=28. Therefore, a typical IDFT matrix M decomposition, such as $M_2^{(63)}\cdot M_1^{(63)}\cdot M_0^{(32)}$, results in 63+63+32=158 diagonals to be generated in the encoding process, which shall be used during the C2S step. For each residue, there are N coefficients, having 4 bytes word size (32 bits), thus a single residue polynomial of N=64K equals 0.26 MB.

Each diagonal comprises 64K by 32-bit coefficients for each residue polynomial (L+K), where L+K equals 56 for C2S and 28 for S2C. Since there are a total of 158 diagonals in the three sub-matrices (i.e., 32 in the first, 63 in the second, and 63 in the third) the memory footprint for C2S sum-up to 2.2 GB and 1.1 GB for S2C, totaling approximately 3.3 GB. In some exemplary embodiments, the encoding process may be performed by accelerator chassis 400. Additionally, or alternatively, the encoding process is performed during a compilation phase of the FHE program. In another embodiment, the method is performed prior to the execution of the bootstrapping process by, for example, FHE accelerator 470. However, it is emphasized that the encoding process is pre-computed and stored once for each FHE program and may be reused throughout the bootstrapping process (runtime), therefore there is no computational penalty during runtime.

It will be reminded that the bootstrapping process involves three main steps (C2S, Sine, and S2C) and can be performed at any time when a current multiplicative level l of the ciphertext becomes too low to proceed without decryption. The purpose of the bootstrapping process is to increase or restore the multiplicative level L of the ciphertext. In a particular example, L is set to 8 such as illustrated in FIG. 5B.

One technical problem dealt with by the disclosed subject matter is the limited on-die memory capacity in ASIC technology, which currently cannot exceed ~1 GB. For example, in the context of an FHE accelerator, such as internal memory 472 of FHE accelerator 470, the need for approximately 3.3 GB of auxiliary data exacerbates the issue. This constraint necessitates reliance on external memory, leading to bandwidth bottlenecks as the accelerator frequently loads auxiliary data from the external memory. This repeated loading becomes a significant bottleneck, causing execution delays and rendering FHE schemes impractical for commercial applications.

Another technical problem is the computation-time overhead caused by the repetitive bootstrapping sequence in combination with the same memory-bandwidth limitation.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), memory, and input/output interfaces. The computer platform may also include an operating system and microinstruction code. The various processes and functions described herein may be either part of the microinstruction code or part of the application program or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A system for fully-homomorphic-encryption (FHE) inference, the system comprising:
    a plurality of server modules;
    an interconnect operatively coupled to each of the plurality of server modules, the interconnect being configured to distribute session initialization data for a large language model session to the plurality of server modules;
    a first plurality of application-specific integrated circuits s-disposed on one or more of the plurality of server modules, each accelerator being configured to perform bootstrapping operations on ciphertexts during an initiation phase of the large language model session; and
    a second plurality of application-specific integrated circuits disposed on the plurality of server modules, the second plurality of application-specific integrated circuits comprising: (i) bootstrapping circuitry configured to store auxiliary data used during the bootstrapping operations and to perform the bootstrapping operations on the ciphertexts; (ii) processing circuitry configured to perform homomorphic arithmetic operations other than the bootstrapping operations; and (iii) support circuitry configured to perform functions that support the bootstrapping circuitry and the processing circuitry-; and wherein the bootstrapping circuitry is configured to perform modulus adjustment, coefficient-to-slot conversion, slot-to-coefficient conversion, and re-linearization on the ciphertexts without, or with reduced, access to volatile memory located external to the bootstrapping circuitry.

2. The system of claim 1, wherein the first plurality of application-specific integrated circuits are dedicated, during the initiation phase, to bootstrapping ciphertexts that encrypt prompt tokens, and, after generation of a first response token, are reassigned to bootstrap prompt tokens of other large language model sessions.

3. The system of claim 1, wherein the processing circuitry comprises one or more buffers operable in a double-buffer mode such that a first half of each buffer stores plaintext-weight blocks while a second half of each buffer is used for concurrent execution of the homomorphic arithmetic operations.

4. The system of claim 1, wherein the support circuitry is configured to perform decompression of data used by the bootstrapping circuitry and the processing circuitry.

5. The system of claim 1, further comprising a compile-time scheduler that allocates one or more of: transfer slots, accelerator assignments, or buffer hand-offs across the interconnect.

6. The system of claim 1, wherein the interconnect comprises a backplane having a main trunk and lateral branches that distribute the session initialization data to each of the plurality of server modules.

7. The system of claim 1, further comprising a management controller configured to track activity counters in the bootstrapping circuitry and, when the session remains inactive beyond a configurable timeout, overwrite the auxiliary data stored by the bootstrapping circuitry, clear a session mapping, and return the bootstrapping circuitry to an unassigned resource pool.

8. The system of claim 1, wherein the bootstrapping circuitry is configured to store a compressed auxiliary-data image corresponding to the session.

9. The system of claim 1, wherein the interconnect includes at least one link that delivers the session-initialization data directly to an accelerator on a server module.

10. The system of claim 1, wherein at least one of the second plurality of application-specific integrated circuits is dedicated, during a generation phase of the large-language-model session, to bootstrapping ciphertexts produced during the generation phase.

11. A non-transitory computer-readable medium storing instructions that, when executed by one or more processors of a system, cause the processors to perform operations comprising:

distributing session-initialization data over an interconnect for a large-language-model session;

operating a first plurality of application-specific integrated circuits to perform bootstrapping on ciphertexts during an initiation phase; and operating a second plurality of application-specific integrated circuits by: (i) causing bootstrapping circuitry to store auxiliary data used during bootstrapping and to perform bootstrapping operations on ciphertexts; (ii) causing processing circuitry to perform homomorphic arithmetic operations other than bootstrapping; and (iii) causing support circuitry to perform functions that support the bootstrapping and processing circuitry; and wherein the system comprises: a plurality of server modules, the interconnect operatively coupled to each of the server modules, the first plurality of application-specific integrated circuits disposed on one or more of the server modules, and the second plurality of application-specific integrated circuits disposed on the server modules-; and wherein the instructions, when executed, further cause the bootstrapping circuitry to perform modulus adjustment, coefficient-to-slot conversion, slot-to-coefficient conversion, and re-linearization on the ciphertexts without, or with reduced, access to volatile memory located external to the bootstrapping circuitry.

12. The non-transitory computer-readable medium of claim 1, wherein the instructions, when executed by the one or more processing circuitry of the system, further cause the first plurality of application-specific integrated circuits to be dedicated, during an initiation phase, to bootstrapping ciphertexts that encrypt prompt tokens, and, after generation of a first response token, to be reassigned to bootstrapping prompt-token ciphertexts of other large-language-model sessions.

13. The non-transitory computer-readable medium of claim 1, wherein the instructions, when executed, further cause the processing circuitry to employ one or more buffers operable in a double-buffer mode such that a first half of each buffer stores plaintext-weight blocks while a second half of each buffer is used for concurrent execution of the homomorphic arithmetic operations.

14. The non-transitory computer-readable medium of claim 1, wherein the instructions, when executed, further cause the support circuitry to perform decompression of data used by the bootstrapping circuitry and the processing circuitry.

15. The non-transitory computer-readable medium of claim 1, wherein the system further comprises a compile-time scheduler, and the instructions, when executed, further cause the compile-time scheduler to allocate one or more of transfer slots, accelerator assignments, or buffer hand-offs across the interconnect.

16. The non-transitory computer-readable medium of claim 1, wherein the interconnect comprises a backplane having a main trunk and lateral branches, and the instructions, when executed, further cause distribution of the session-initialization data to each of the plurality of server modules via the backplane.

17. The non-transitory computer-readable medium of claim 1, wherein execution of the instructions causes the session-initialization data to be delivered over at least one link of the interconnect directly to an accelerator on a server module.

18. The non-transitory computer-readable medium of claim 1, wherein the instructions, when executed, further cause at least one of the second plurality of application-specific integrated circuits to be dedicated, during a generation phase of the large-language-model session, to bootstrapping ciphertexts produced during the generation phase.

* * * * *